March 29, 1966

E. A. MORGAN 3,243,117

BUILDING STRUCTURES

Filed Aug. 12, 1964

INVENTOR:
EMSLIE A. MORGAN
BY
Browne, Schuyler & Burridge
ATTORNEYS

March 29, 1966 E. A. MORGAN 3,243,117
BUILDING STRUCTURES
Filed Aug. 12, 1964 5 Sheets-Sheet 2

INVENTOR:
EMSLIE A. MORGAN
BY
Browne, Schuyler & Burridge
ATTORNEYS

March 29, 1966  E. A. MORGAN  3,243,117
BUILDING STRUCTURES
Filed Aug. 12, 1964  5 Sheets-Sheet 4

INVENTOR:
EMSLIE A. MORGAN
BY
Browne, Schuyler + Beveridge
ATTORNEYS

March 29, 1966  E. A. MORGAN  3,243,117
BUILDING STRUCTURES
Filed Aug. 12, 1964  5 Sheets-Sheet 5
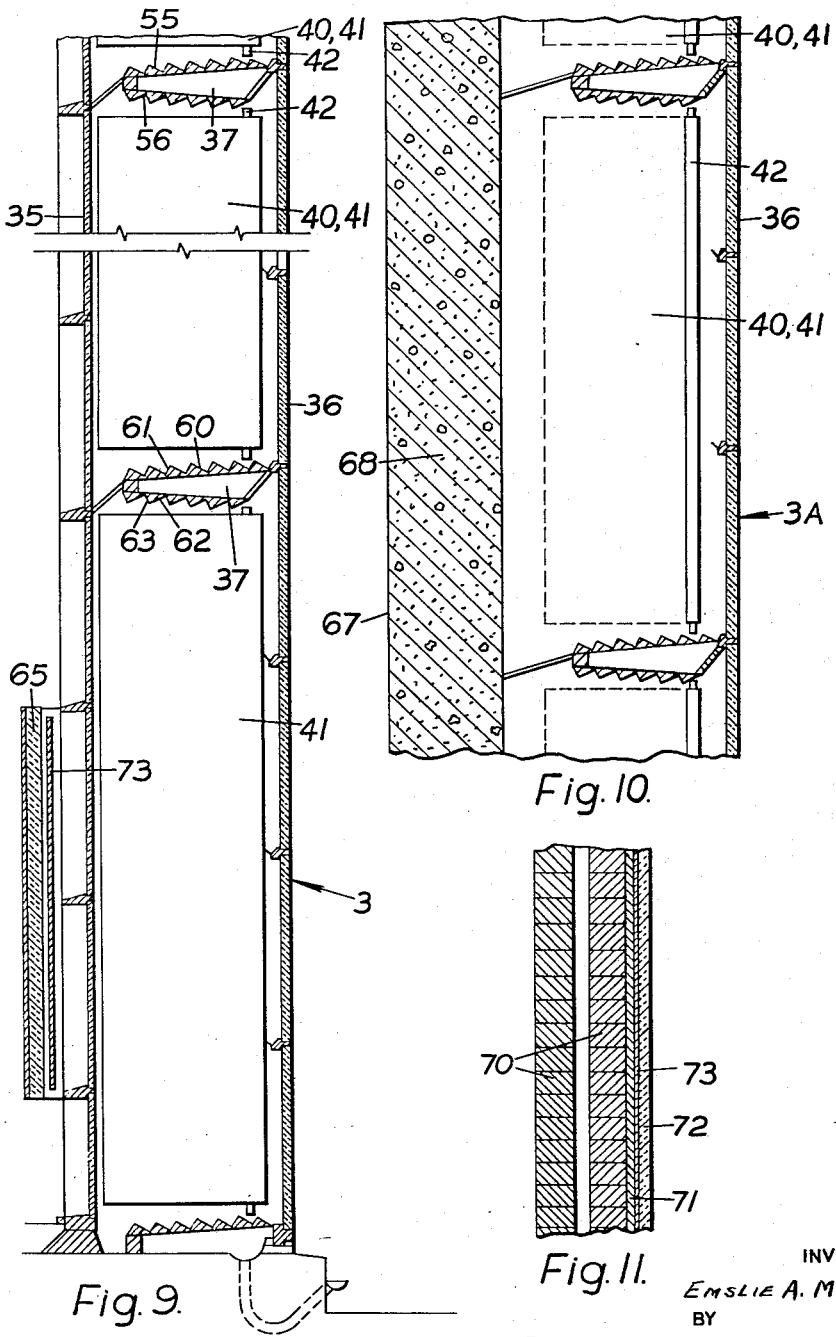
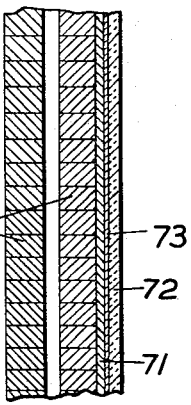
INVENTOR:
EMSLIE A. MORGAN
BY
Browne, Schuyler & Beveridge
ATTORNEYS

United States Patent Office 3,243,117
Patented Mar. 29, 1966

3,243,117
BUILDING STRUCTURES
Emslie Alexander Morgan, Wallasey, Wirral, England; Westminster Bank Limited, administrator of estate of said Emslie Alexander Morgan, deceased
Filed Aug. 12, 1964, Ser. No. 389,115
Claims priority, application Great Britain, Apr. 6, 1961, 12,351/61
6 Claims. (Cl. 237—1)

The present application is a continuation-in-part of application Serial No. 184,798 filed April 3, 1962, and now abandoned.

The present invention relates to building constructions and more particularly the heating of useful accommodation within the building. The useful accommodation is that accommodation which is intended to be used for the purpose for which the building is designed and built. For example, in a school the useful accommodation comprises the class rooms but may also include an assembly hall, corridors and the like.

It is common practice to employ central heating to heat the useful accommodation of buildings. Central heating is expensive to install because it requires radiators for radiating heat, piping for circulating the heating fluid and a heater for heating the fluid.

There have been a number of proposals for heating useful accommodation in buildings partly or wholly by the use of solar radiation with the object of reducing or eliminating fuel costs. Whilst such solar heating systems have been successfully used they have hitherto not become a commercial proposition because of the greater expenditure incurred in constructing a building which is capable of being satisfactorily heated by solar radiation.

In some prior art solar heating systems the radiation from the sun is used for heating the useful accommodation whilst the sun is shining and some other heating means is provided for heating the useful accommodation when there is insufficient or no solar radiation. Such a building has to be specially constructed to enable it to be solar heated but also requires a normal heating installation which may be as expensive as a comparable one installed in a conventionally heated building.

In prior art buildings adapted to be heated entirely by solar radiation, a special room, usually a loft is provided for the collection of solar radiation and means is provided in this special room for converting the solar radiation into heat and passing it into a fluid by means of which the heat is transferred to some point of storage from where it can be distributed to the useful accommodation as required. In one particular solar heating system of this kind the solar radiation passes through a large collecting window in the loft and falls upon a collector. The heat is removed from the collector by means of air which is circulated to heat storage "bins" closer to the useful accommodation. The heat is transferred from the heat storage bins to the useful accommodation when required by the further circulation of air.

Thus it will be seen that none of the prior art solar heating systems has obviated the necessity for a heating installation as such, be it only a circulating system for distributing the solar heat to the useful accommodation.

Solar heating systems require the buildings in which they are incorporated to be insulated against heat loss. Thus the expense of the prior art solar heating system has been not only the expense of the installation of the heating system itself but also the expense of additional heat insulation material applied to the walls and roof of the building.

It has never been thought a practical proposition to deliberately apply heat insulating material on a generous scale to buildings adapted to be heated by a conventional heating system because the interest and repayment of capital required to provide and fit such heat insulation is likely to be greater than the cost of fuel saved.

It is an object of the present invention to construct a building, adapted to be heated solely by radiation emanating from at least one incandescent source, such as the sun, without requiring any heating installation as such within the building.

It is another object of the present invention to provide a building, adapted to be heated solely by radiation emanating from at least one incandescent source, that is adapted to store the radiation as heat directly adjacent the useful accommodation so that the heat is always present at the useful accommodation where it is required.

It is a still further object of the invention to provide a building whose useful accommodation is adapted to be heated by the maintenance therein of a flux of warming radiation extending substantially throughout the useful accommodation.

It is yet another object of the invention to provide a building which the walls of the useful accommodation are maintained at a temperature higher than the air temperature in the useful accommodation by impinging on the walls radiation emanating from at least one incandescent source, such as the sun, such radiation being partly reflected by the walls and partly absorbed by the walls so as to pass into storage in the walls until required.

The invention is further described, by way of example only and not for the purposes of limitation, with reference to the accompanying drawings in which:

FIG. 9 is a fragmentary sectional elevation through a part of the solar wall designed to transmit solar radiation to the useful accommodation within the building;

FIG. 10 is a fragmentary sectional elevation of another part of the solar wall designed to absorb solar radiation directly into the heat storage material of the building; and FIG. 11 is a sectional view illustrating one mode of applying insulation to the inside of an existing cavity wall.

Figure 1:
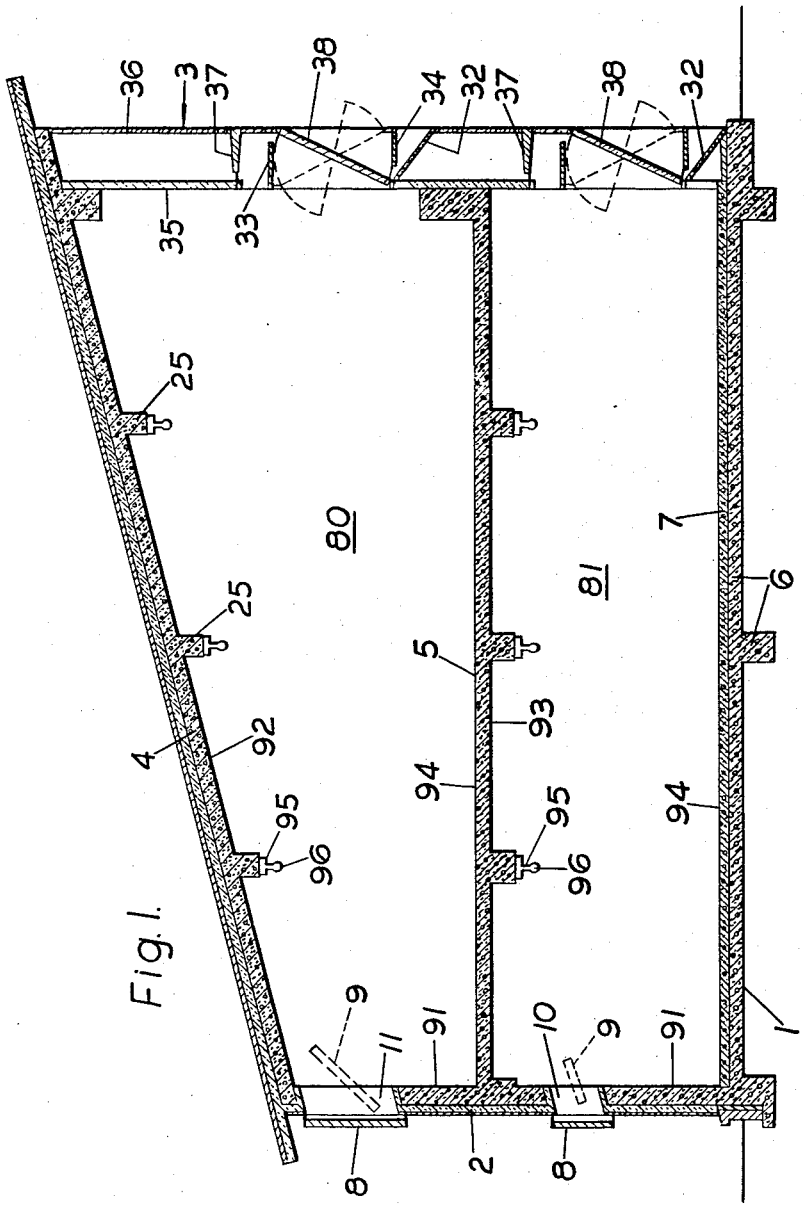
FIG. 1 is a side sectional elevation of a building, more particularly a school.

More specifically the invention provides a building wherein the wall surfaces bounding the useful accommodation are heat transfer surfaces which are exposed to receive, from time to time, radiation emanating from at least one incandescent source. The incandescent source is usually the sun in which case the building is provided with a solar wall through which the solar radiation passes directly into the useful accommodation to impinge the heat transfer surfaces. The main fabric of the building or at least a major part thereof acts also as heat storage material and is provided with heavy external insulation. The term "fabric" as used herein includes the walls, the floor and roof and ceiling of the building and includes all strength members, such as beams, facings such as tiles, and permanent fixtures. Thus the heat transfer surfaces are surfaces of the fabric of the building and the heat absorbed by the heat transfer surfaces is conducted directly to the fabric acting as heat storage material and is stored therein until required. Thus the useful accommodation may be maintained at a habitable temperature without the use of any heating installation as such since the heat required is conducted as radiation to the useful accommodation where it is stored until it is wanted. No fluid circulating system is required at all, unless ventilating means is required to prevent the useful accommodation becoming too warm in summer. Even then forced ventilation is usually unnecessary.

Artificial illumination means, such as electric lights, may be used in addition to or instead of the sun as incandescent sources for providing the radiation which is to impinge the heat transfer surfaces in the useful accommodation.

The roof and external walls, in so far as they are not designed for the transmission of solar radiation, are heavily insulated down to a U value of from 0.03 to 0.15 (and preferably of from 0.03 to 0.10).

The "U value" referred to herein is the rate of heat loss in British thermal units per hour per square foot of surface of insulation per degree Fahrenheit of temperature difference across the insulation.

The U value of the heat insulating layer is so chosen in relation to the heat storing capacity of the fabric that the average rate of impingement of radiation from the incandescent source balances the rate of heat loss through the building under the coldest weather conditions the building is likely to encounter. The average rate of radiation from the electric lighting installation and body heat may be taken into account.

U values appropriate to the present invention may be achieved by the application of a layer of expanded polystyrene or equivalent heat insulating material of from 2″ to 5″ thick to the external walls and roof. If the external walls are largely relied upon for heat storage then the insulating layer should be applied to the external surface thereof and provided with a vapour barrier internally and a moisture barrier externally.

If the external walls are not heavily relied upon for heat storage the insulating layer is preferably applied to the internal surfaces thereof with a vapour barrier on the inside of the insulating layer and preferably also on the outside of the insulating layer between the layer and the walls.

The heat storage material, usually forming at least a major part of the fabric of the building should have a heat storing capacity not less than 5 British thermal units and preferably not less than 25 British thermal units per square foot of floor area of the useful accommodation per degree Fahrenheit rise or fall in temperature of the heat storage material.

The heat storage material incorporated in the building and its internal heat transfer surfaces should be such as to provide a thermal path of low resistance from the surfaces to the heat storage material therebehind. The surface itself should be capable of absorbing radiation either solar or from electric lamps of the order of from about 0.3 up to 5.0 microns wavelength. Whether or not it will be desirable for the surface of a room or other space to have an absorptivity nearing 100% will depend upon the design of the particular room. Thus it may be desirable for the surface to have a certain degree of reflectivity so as to build up a radiative flux in the room and to distribute the radiation more evenly over the surfaces of the room. The degree of absorption and reflectivity can to a considerable extent be controlled by the formulation of the paint applied to the surfaces.

The heat transfer surfaces should moreover be capable of absorbing long wavelength radiation from other surfaces in the room and in particular body heat from the occupants. Any surfaces which do not bound heat storage material should be reflective rather than absorbent to short wavelength radiation but should be capable of absorbing long wavelength radiation. The overall effect should be such as to provide heat storage material capable of absorbing a large quantity of heat with a minimum rise in surface temperature. A good example of a traditionally constructed ceiling for embodiment in a building constructed in accordance with the present invention is a ceiling formed from a dense concrete slab with a suitable paint applied to the underside.

To avoid undue heat loss through casual air infiltration it is very desirable in building structures according to the present invention that the external shell of the building should be sealed against undue casual ingress of air and in particular that means should be provided for sealing around the external doors and ventilators.

An important feature of the mode of heating of the present invention is that the internal bounding surfaces of a room tend to be maintained at a temperature slightly higher than that of the air of the room and the air is not used to any significant extent for the distribution of heat. Most conventional forms of heating tend to keep the air temperature above the temperature of a major portion of the bounding surface. This feature of the invention yields certain advantages as follows:

(a) Of two rooms of the same equivalent temperature one having a mean wall surface temperature somewhat higher and the other having a mean wall surface temperature somewhat lower than the air temperature, that with the means wall surface temperature higher than the air temperature will, other factors being equal, be considered the more comfortable by the majority of people.

(b) Maintaining the bounding surfaces at temperatures above the air temperature will greatly reduce the rate of soiling of the decorative surfaces.

(c) Advantages of a medical character.

The solar wall preferably incorporates a light diffusive glass so as to scatter a proportion of the solar radiation and so obtain a more uniform distribution of the radiation falling on the heat transfer surfaces.

To minimise heat loss through the solar wall, such a wall preferably comprises inner and outer walls of light transmitting material, such as glass.

Corrugated reflective surfaces extending approximately horizontally inwardly from the outer skin of the solar wall towards the inner skin may be provided at vertically spaced intervals in the solar wall with the object of reflecting back heat radiation from the inner skin to the outer skin thus improving the U value of the solar wall. These corrugations can be designed to reduce the collection of solar heat from the high summer sun.

The fabric of the building illustrated in FIG. 1 comprises a base 1, external walling 2, an upper floor 5 and a roof 4. The building is suitably framed either by steel or concrete and incorporates a solar wall 3. The base comprises a concrete mass 6 having a surface layer of concrete 7 with a damp proof layer therebetween.

The walling 2 is formed with ventilating openings 10, 11 therein. The openings 10, 11 are each closable by a horizontally pivoted insulated shutter 9 and can be shielded by louvres 8.

Figure 2:
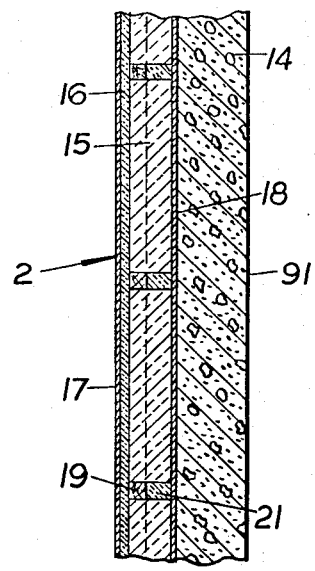
FIGS. 2 and 3 are a sectional side elevation and sectional plan view of a typical wall structure.
Figure 3:
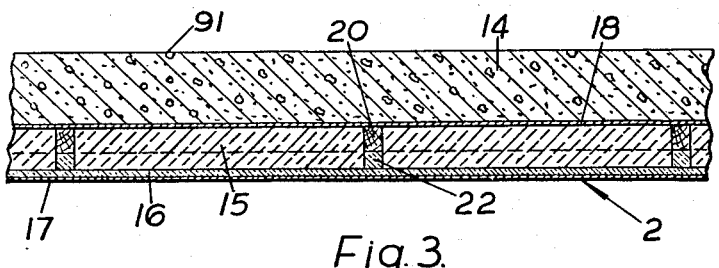

The walling 2 is constructed as illustrated in FIGS. 2 and 3 and comprises 9″ thickness of concrete 14, 5″ thickness of foamed polystyrene 15, ¾″ thick insulation board 16, an outer vapour barrier 17 of bituminous felt and a vapour barrier 18 of bituminous felt between the concrete 14 and the foamed polystyrene 15. The foamed polystyrene is in the form of slabs supported between wooden rails 19 and wooden posts 20, the spaces between the rails and posts 19 and 20 and the concrete 14 being filled by strips of foamed polystyrene 21, 22. The inner surfaces 91 of the concrete 14 are painted with a paint having a suitable coefficient of reflectivity to provide heat transfer surfaces.

Figure 4:
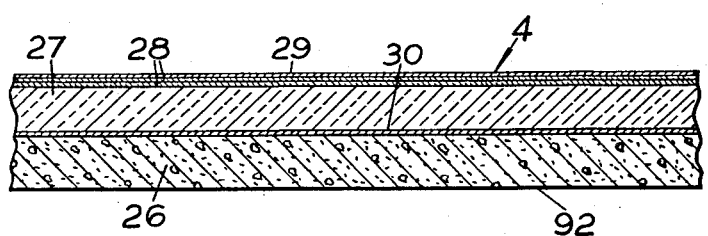
FIG. 4 is a section through the roof.

The roof 4 incorporates re-inforced concrete beams 25. The roof section between the beams is illustrated in FIG. 4 and comprises an inner layer 26 of concrete, an outer insulating layer 27 of foamed polystyrene 5″ thick, two layers 28 of ½" insulation board with joints staggered and an outer vapour barrier 29 of bituminous roofing felt. A vapour barrier 30 is provided between the concrete 26 and the insulation 27. The inner surface 92 of the roof concrete 26 is painted to provide a heat transfer surface.

The floor 5 is constructed of re-inforced concrete and divides the building into an upper storey 80 and a lower storey 81. The ceiling concrete beneath the floor 5 is painted to provide a heat transfer surface. The base 1 and the floor 5 are provided with suitable floor coverings 94, for example, thermoplastic tiles of a suitable light colour, such as yellow, to provide further heat transfer surfaces. The heat transfer surfaces 91, 92, 93, 94 are so disposed as to receive, at least indirectly and for the most part directly, solar radiation passing through the solar wall and through the useful accommodation 80, 81.

Figure 5:
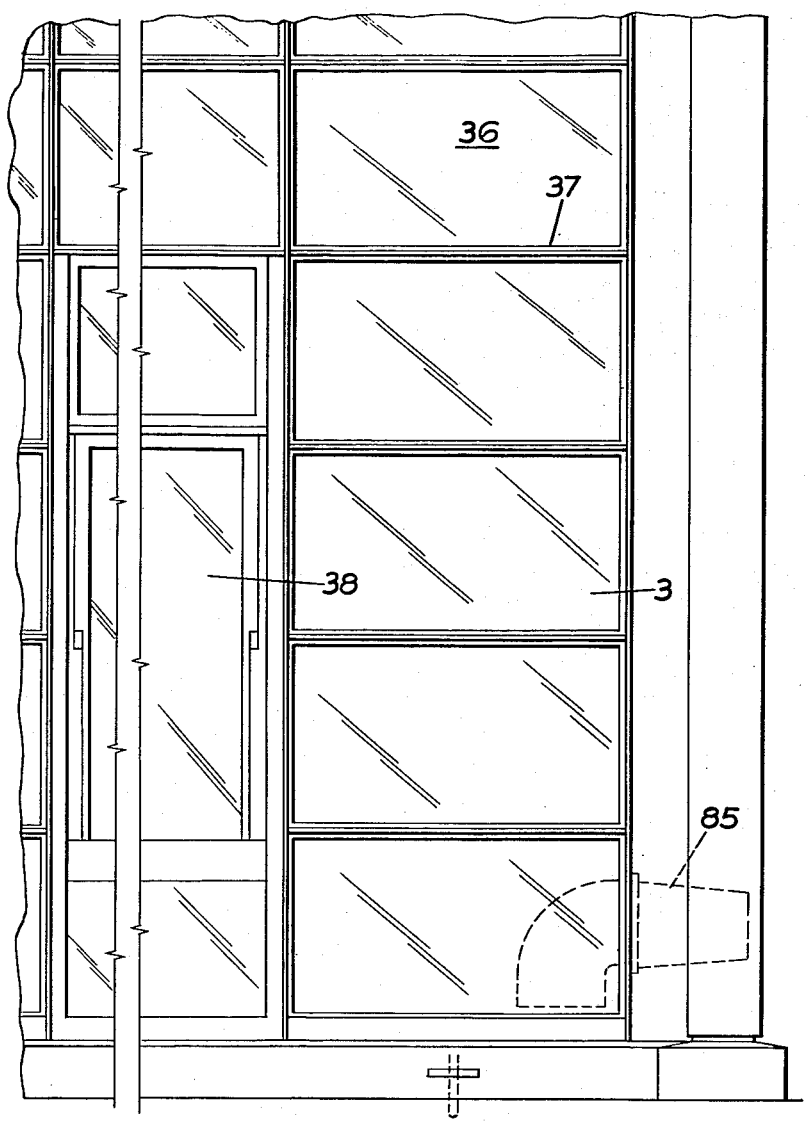
FIG. 5 is a fragmentary elevation illustrating the solar wall from the exterior of the building.

The solar wall 3 diagrammatically illustrated in FIG. 1 comprises an inner glazed skin 35 and an outer glazed skin 36 which is spaced from the inner skin by about two feet. The framing on the inner skin 35 is 3" x 1½" I-section steel and that of the outer skin 36 is 1½" x 1½" T-section steel. Walkways 37 supported between the inner and outer skins facilitate the cleaning of the glazing in the cavity between the skins. The external appearance of the solar wall is illustrated in FIG. 5.

The inner skin 35 comprises a diffusive or reflective glass capable of scattering the solar radiation so as to distribute such radiation more uniformly over the heat transfer surfaces 91, 92, 93, 94. The inner skin 35 should not be too diffusive, however, or the solar wall would appear as a complete wall of light and would be unpleasant to the eyes.

Double glazed windows 38 are pivoted at their midheight between upper and lower horizontal louvre panels 33, 34. A glass sheet 32 slopes downwardly and outwardly from the inner edge of the lower louvre panel 34. When a window 38 is upwardly inclined to the right as illustrated in FIG. 1 the window is closed but when inclined upwardly to the left as indicated in broken lines in FIG. 1 the window remains burglar and weather proof but permits ventilation to occur through the louvres 33 and 34.

Shutters of insulating material are pivoted about vertical axes between the inner and outer skins 35 and 36 of the solar wall. One form of shutter arrangement is shown in FIG. 6 wherein pairs of insulated shutter panels 40, 41 are pivoted about adjacent axes 42 near to the outer skin 36 of the solar wall so that they can occupy positions perpendicular to the skins of the solar wall where they permit the transmission of solar radiation through the solar wall but can be moved to positions parallel with the skins of the solar wall where they serve to insulate the solar wall against the transmission of heat outwardly therethrough, as shown by dotted lines.

Figure 6:
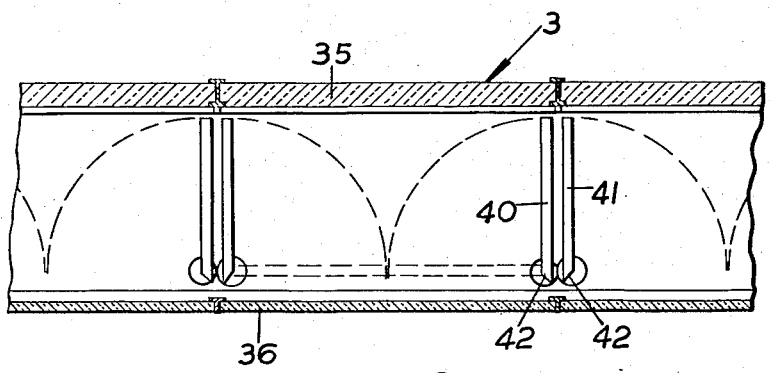
FIG. 6 is a fragmentary view illustrating one arrangement of shutters in the solar wall.
Figure 7:
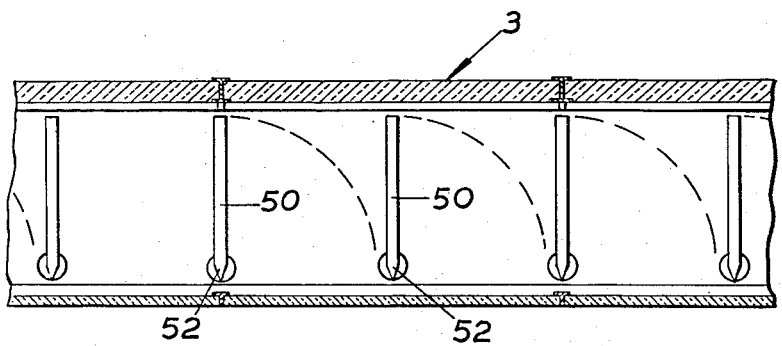
FIG. 7 illustrates an alternative arrangement of shutters within the solar wall.

FIG. 7 illustrates an alternative arrangement in which shutters 50 are arranged singly at spaced intervals from one another instead of in pairs as in FIG. 6 and which open by angular displacement about axes 52 in the same direction instead of by angular displacement in opposite directions as in FIG. 6.

Figure 8:
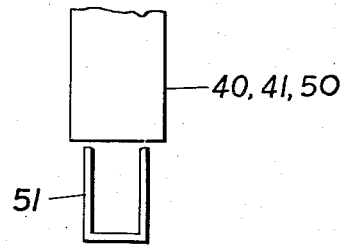
FIG. 8 is a fragmentary view to illustrate the framing of the shutters.

The shutters of the solar wall when in their closed positions are framed by channel framing 51 as diagrammatically illustrated in FIG. 8, the flanges of the channels being spaced by only a small distance of the order of a sixteenth to an eighth of an inch from the edges of the shutters to obstruct thermal air currents passing around the edges of shutters.

FIG. 9 is a sectional elevation illustrating part of the solar wall 3 in more detail. Corrugated reflective surfaces 55 and 56 are provided above and below the walkways 37 and extend approximately horizontally inwardly from the outer skin of the solar wall towards the inner skin with the object of reflecting back outward heat radiation from the inner skin to improve the U value of the solar wall and also to reflect outwardly a portion of the solar radiation from the high level summer sun. The facets 60, 61 of the upper reflective surfaces 55 may lie at angles of 153° and 243° respectively to the horizontal whilst those, 62 and 63, of the lower reflective surfaces 56 may lie at angles of 26° and 116° respectively to the horizontal.

A heat insulating screen 65 is provided immediately behind a lower part of the solar wall to protect occupants immediately therebehind from undue exposure to the sun, the solar radiation being absorbed by a metal baffle plate 73 and distributed therefrom as convected heat to the air in the building.

FIG. 10 illustrates an alternative form of solar wall 3A in which the inner skin 68 thereof is of heat absorbing material rather than heat transmitting material. Heat absorbed by the inner skin 68 from the sun is conducted to the inner surface 67 thereof and then transmitted into the building by convection and radiation therefrom. An important feature of the inner skin 68 is that heat is stored therein with only a relatively small rise in temperature of the material of the inner skin itself. When the sun is obscured loss of heat from the inner skin 68 can be minimised by closing the shutters 40, 41.

Ventilators 85 (see FIG. 5) containing air filters are preferably provided for ventilating the interior cavity of the solar wall 3 so that the air drawn into this cavity by temperature and barometric variations is cleansed of dust and other impurities which would deposit on and soil the interior surfaces of the solar wall.

The present invention may be applied to existing building structures such for example as dwelling houses by the application of a layer of insulation to the inner surface of the external walls as illustrated in FIG. 11 where cavity walls 70 of brickwork with a layer of plaster 71 on its inner face is provided with a layer 72 of expanded polystyrene.

A vapour barrier 73, for example of aluminum faced paper, is provided on the concealed face of the polystyrene layer between the plaster 71 and the polystyrene layer 72. The thickness of the polystyrene layer may be of the order of 2 or 3 inches.

Electric light fittings 95 supporting electric light bulbs 96 are mounted beneath the roof 4 and beneath the floor 5 for illuminating the upper and lower storeys 80 and 81 at night and when there is insufficient sunlight. The fittings 95 are so disposed that the lamps 96 are supported thereby shine on substantially the whole of the heat transfer surfaces 91, 92, 93 and 94.

The heat transfer surfaces 91, 92, 93 and 94 form substantially the whole of the surfaces bounding the useful accommodation 80, 81. These heat transfer surfaces are so disposed as to receive solar radiation through the solar wall 3 and through the useful accommodation 80, 81. Some of the solar radiation is diffused by the inner skin 35 of the solar wall, which preferably has a southerly aspect in the northern hemisphere, to distribute the heat radiation more uniformly over the heat transfer surfaces. A minor proportion of the radiation impinging on the heat transfer surfaces is reflected therefrom and falls mainly on other parts of the heat transfer surfaces. This enables a still more even distribution of the radiation over the heat transfer surfaces to be obtained. Only a minor proportion of the reflected radiation, which itself is a minor proportion of the received radiation, passes outwardly again through the solar wall 3 to be lost.

The major proportion of the radiation falling on the heat transfer surfaces is converted into heat and passes into storage in the concrete 5, 6, 7, 14, 25, 26. The fabric of the building is thereby maintained at a temperature which in practice is slightly higher than the temperature of the air in the useful accommodation 80, 81. The stored heat which is reradiated into the useful accommodation is comparatively long wavelength radiation and forms, together with the incident and reflected short wavelength radiation from the sun, a flux of warming radiation throughout the useful accommodation.

The U value of the layers of insulation 15, 16, 27, 28 is chosen in relation to the heat storing capacity of the concrete 5, 6, 7, 25, 26 that, during a normal winter, sufficient heat is stored in the concrete, forming the fabric of the building, to maintain the useful accommodation 80, 81 at a habitable temperature day and night and from day to day. In schools and in most office buildings and the like the habitable temperature is 65° F. to 70° F. In a room, such as a school gymnasium, where the occupants exert themselves physically, the habitable temperature is lower usually 50° F. to 55° F. In very cold weather in winter the daylight hours are short and the lights 96 will usually be lit for at least a substantial proportion of the time the useful accommodation is occupied. The radiation emanating from the lights falls on the heat transfer surfaces 91, 92, 93, 94 and should be taken into consideration when determining the U value of the insulation in relation to the heat storage capacity of the fabric. Also when a large number of persons are likely to occupy the useful accommodation for any length of time, as in school class rooms, the body heat introduced into the useful accommodation should also be taken into account. Furthermore the heat lost at night time may be reduced by closing the shutters 40, 41 in the solar walls to prevent the escape of radiation from the useful accommodation.

In the summer, the useful accommodation would be overheated if certain precautions were not taken. Thus in summer the ventilators 9 and the windows 38 are left open, especially at night, to take away the heat stored in the heat storing fabric during the previous daytime. The windows 38 may be locked in an open position in which the louvres 33, 34 allow free ventilation but prevent burglars from entering the building. In fact in hot summer weather the thermal capacity of the fabric may be relied upon to keep the building cool. Thus the heating system of the present invention may also be used as a cooling system.

The present invention envisages the possibility, in buildings wherein windows are not required, of heating the useful accommodation therein entirely by means of the lighting installation. It should be pointed out that a lighting installation is necessary in almost any building and as the radiation emanating from the lights may be used to heat the accommodation according to the present invention, the useful accommodation can be maintained at a habitable temperature without resorting to a heating installation as such.

In a building constructed according to the present invention, the extra cost of applying the heavy insulation is offset by not having to install a heating system, such as a central heating system, involving expensive pipework and/or duct work, pumps, heating means, etc. Fuel costs are low or non-existent. A low fuel cost may arise in cases wherein it is necessary to have the electric lights illuminated rather longer than is necessary to provide the desired illumination. In other words if any heat additional to or instead of solar radiation is required in a building constructed according to the present invention this can be readily obtained from the electric light fittings which must be installed in any event and it is not necessary to provide any supplemental heating means.

It is characteristic of a building constructed according to the present invention that the heat transfer surfaces 91, 92, 93, 94 are maintained at a temperature a few degrees higher than the air temperature within the useful accommodation. It has been found that this temperature difference is a good indication of the state of ventilation of the useful accommodation. Thus if it is perceived that the air temperature has risen above the wall temperature (for example, due to the presence of extensive body heat) this is an indication that the ventilation is insufficient.

Not all the useful accommodation of a building constructed according to the present invention need be heated by radiation emanating from an incandescent source. For example, in a school constructed according to the present invention it was found that, in view of the remoteness of the kitchens from the solar wall and the ready availability of other sources of heating in the kitchens it was more convenient to use electric or steam heaters for maintaining the kitchens at a habitable temperature.

I claim:
1. In a building having useful accommodation adapted to be heated solely by heat of radiation emanating from at least one incandescent source, the combination comprising:
   means for admitting solar radiation into said useful accommodation,
   heat storage material having heat transfer surfaces thereon in thermally conductive relationship with said heat storage material, said heat transfer surfaces constituting a major proportion of the internal surface of said useful accommodation,
   said heat transfer surfaces being exposed to receive from time to time radiation emanating from said incandescent source and transmitted through said useful accommodation, and said surfaces being capable of reflecting a proportion of the radiation so received back into said useful accommodation, of absorbing the remainder of the radiation so received as heat and passing such heat into storage in said heat storage material and of re-radiating the stored heat into said useful accommodation to maintain a flux of warming radiation throughout said useful accommodation, and
   a layer of heat insulating material incorporated in said building and substantially enveloping both said useful accommodation and said heat storage material to minimize loss therefrom,
   the heat storing capacity of said heat storage material and the U value of said heat insulating layer being chosen in relation to one another so that, in normal use of the building, radiation received by said heat transfer surfaces and passed as heat into storage in said heat storage material is sufficient to maintain said useful accommodation at a habitable temperature during intervals of time when the rate of said receipt of energy of radiation by said heat transfer surfaces is less than the rate of heat loss from said useful accommodation.

2. A building constructed in accordance with claim 1 wherein the heat storing capacity of said heat storage material is from 5 British thermal units to 25 British thermal units per square foot of floor area of the useful accommodation per degree Fahrenheit rise or fall in temperature of the heat storage material.

3. A building according to claim 1 having a solar wall comprising spaced skins of material capable of transmitting solar radiation, one of said skins comprising a light diffusing glass for distributing said solar radiation more uniformly through said useful accommodation.

4. A building constructed in accordance with claim 1 wherein the U value of said heat insulating layer is in the range from about 0.03 to about 0.15.

5. A building constructed in accordance with claim 1 wherein the U value of said heat insulating layer is in the range from about 0.03 to about 0.10.

6. A building according to claim 1 comprising spaced skins of material capable of transmitting solar radiation and heat insulating shutters arranged between said skins, said shutters being movable from open positions, permitting transmission of radiation through said skins, to closed positions at which they substantially diminish the rate of heat loss therethrough.

References Cited by the Examiner

UNITED STATES PATENTS

| | | | |
|---|---|---|---|
| 2,228,521 | 6/1942 | Gregory | 72—41 |
| 2,595,905 | 5/1952 | Telkes | 126—270 |
| 2,625,930 | 1/1953 | Harris | 126—270 |
| 2,671,441 | 3/1954 | Harris | 126—270 |
| 2,844,998 | 7/1958 | Vincent | 50—265 |
| 2,969,918 | 1/1961 | Phelps | 237—1 |
| 2,998,006 | 8/1961 | Johnston | 126—271 |
| 3,013,397 | 12/1961 | Meckler | 62—3 |

OTHER REFERENCES

"The Solar House" by F. W. Hutchinson, pages 55–59, Heating and Ventilating (March 1947) S. Hampton Row, London WC 1, England.

"The Solar House Heating, a problem of Heat Storage" by M. Telkes, pages 68–75, Heating and Ventilating, May 1947, Heating and Ventilating, S. Hampton Row, London WC 1, England.

EDWARD J. MICHAEL, *Primary Examiner.*

FREDERICK L. MATTESON, JR., *Examiner.*

M. L. BATES, *Assistant Examiner.*